June 27, 1967  E. G. VALGOI  3,327,528

FLOW METER

Filed July 8, 1965

INVENTOR.

United States Patent Office 3,327,528
Patented June 27, 1967

3,327,528
FLOW METER
Erwin G. Valgoi, Charlottesville, Va., assignor, by mesne assignments, to Teledyne, Incorporated, Hawthorne, Calif.
Filed July 8, 1965, Ser. No. 470,431
3 Claims. (Cl. 73—179)

ABSTRACT OF THE DISCLOSURE

A rate of climb indicator of the type having a paddle mounted for rotation in response to fluid pressure in a chamber having movable wall elements. The wall elements are adjusted by rotation of a series of screw elements positioned behind rods that hold the elements in position so as to form a wall surface for the chamber.

This invention relates generally to aircraft instruments and particularly to devices for indicating vertical speed of an aircraft.

In prior vertical speed indicators of the vane type a light weight vane has been rotatable in a generally circular chamber as a result of a difference of air pressure on the two sides of the vane which was attached to a slender shaft mounted in bearings. The gap between the vane and the chamber walls necessarily had to be rather small and it proved to be difficult to produce an instrument with a uniform gap, particularly for the curved wall of the chamber. Under such circumstances fine tolerances have been required, resulting in relatively high cost of manufacture, and maintenance has been a problem since uneven metal expansion and contraction, metal creep, and similar troubles have often caused the curvature of the wall to change, thereby throwing the instrument out of calibration.

In order to overcome these and other defects of prior design and operation, I have conceived and built a novel vertical speed indicator which eliminates major weaknesses of former devices.

An object is to provide a vertical speed indicator in which the gap between a rotatable vane and an adjacent circular wall structure is adjustable.

Another object is to provide a vertical speed indicator in which a vane is rotatable adjacent to a circular wall built in adjustable sections.

An additional object is to provide a vertical speed indicator in which a vane is rotatable relative to a circularly curved chamber wall which is made in sections, the individual sections being adjustable toward or from the outer edge of the vane.

Other objects will be evident in the following description.

Figure 2:
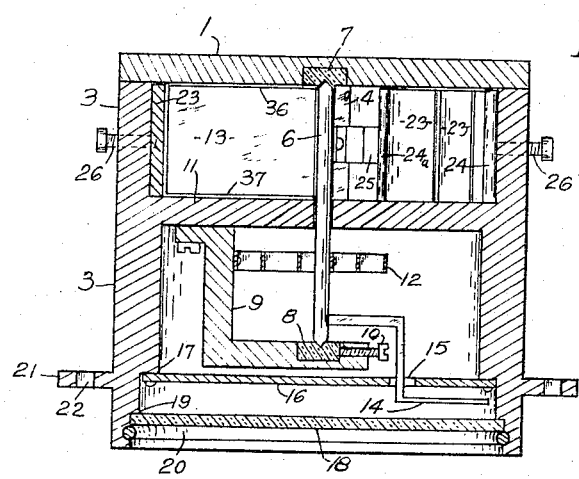
FIGURE 2 is a part sectional plan view of the device of FIGURE 1, which is normally mounted with its axis substantially horizontal.

In the drawings the cover plate 1, shown in FIG. 2, can be attached by means of screws threaded into holes 2 in cylindrical wall 3 which is integral with inwardly directed radially aligned wedge 4 having an arcuately curved tip adjacent the instrument shaft 6 which is rotatably mounted in jewel or other bearings 7 and 8. Bearing 7 is fastened in a recess in plate 1 by means of cement or a screw, and bearing 8 is fastened in a recess in bracket 9 by means of screw 10. Bracket 9 is fastened to inner partition 11 and torsion spring 12 is fastened to the bracket and to shaft 6 which is coaxial with cylindrical casing 3. Dowel pins or a shoulder may be used to align cover 1.

Vane 13 is soldered or otherwise attached to shaft 6 and is radially aligned with respect thereto. The shaft carries attached pointer 14 which is movable in an arcuate slot 15 in disc 16 which is fastened to annular shoulder 17 of casing 3, by means of screws. A suitable scale of vertical speed is attached to the front face of disc 16. Glass or clear plastic disc 18 is held against annular shoulder 19 of the casing by means of resilient split ring 20 which expands into a suitable groove in casing 3. This casing has integral flange 21 with holes 22 through which screws may be placed for attaching the instrument to an aircraft or other vehicle.

A plurality of strips 23, arcuately curved with respect to the axis of shaft 6, are placed closely adjacent to the inner circular wall of casing 3 and have concave edges fitting closely against cylindrical pins or rods 24. The extreme element 23a abuts wedge 4 and the other extreme element 23b is in contact with rod 24a which is urged in clockwise direction by strip spring 25 which is fastened to wedge 4 by means of screws. Screws 26 are radially directed and are in alignment with rods 24. Tension springs 27 have ends soldered or otherwise attached to elements 23 and are placed in radial bores 28 in casing wall 3. These springs are placed under tension and are hooked around pins 29 bridging the openings 28. The springs 27 therefore urge the elements 23 toward the inner circular wall 3a of casing 3 and screws 26 may be turned to move these elements toward the axis. Therefore the inner curved surface of the effective wall adjacent vane 13 may be adjusted radially in rather small sections so that the gap between the combination wall 3b and the edge 13a of the vane may be made substantially constant regardless of the position of the vane. The rods 24 may be of such diameter that the ends of the elements 23 almost touch but sufficient separation between them is left so that the radial adjustment described can be made. In effect, the inner surface 3b is relatively smooth and almost continuous. The spacing between vane 36 and cover 1 and between vane edge 37 and partition 11 is made very close, sometimes as close as 0.001 inch or less.

The spring 25 keeps all of the edges of elements 23 and associated pins or rods 24 in contact. The elements 23 are supported against partition 11 and are closely adjacent cover 1 but are free to move through limited distances both radially and arcuately. An additional cup-like cover can be used to enclose screws 26 if desired. In that case the cover can extend to flange 21 or another flange or shoulder of the casing can be provided for attachment of the added cover.

As shown, the ends of strips 23 have a concavity of the same radius as the radius of rods 24. The central portions of the concavities or troughs in the ends of elements 23 could be deepened so that only tips or edges would touch the rods. This would provide better sealing against fluid loss or escape.

Tube 30 is connected to channel 31 in wedge 4. This channel has an opening in face 32 of wedge 4, leading into chamber portion A on one side of vane 13. Tube 30 may be connected with the static line of the carrying aircraft. Tube 33 having restricted portion 34 is connected with channel 35 in wedge 4. This channel leads into chamber B through an opening in the opposite face of wedge 4. Tube 33 leads to the atmosphere. A porous plug may be connected with tube 33 if desired.

Figure 1:
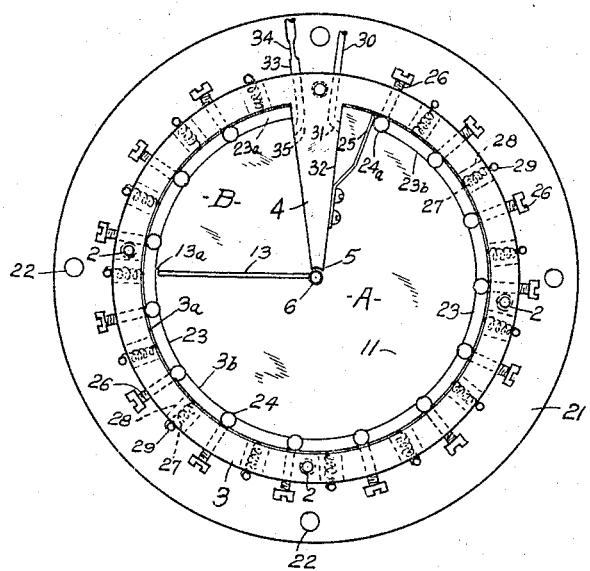
FIGURE 1 is a rear elevation of my improved vane type vertical speed indicator, with cover plate removed.

In operation, the instrument is suitably mounted in an aircraft after cover 1 is in place as shown in FIG. 2. As the aircraft ascends the air pressure in chamber A will closely follow the atmospheric pressure but the pressure in chamber B will change more slowly due to restricted tube portion 34 or due to a porous plug if used. Therefore for ascending aircraft the greater pressure in chamber B will cause air to flow past vane 13 into chamber A, rotating the vane counter clockwise, as seen in FIG. 1, until the dynamic torque on the vane is balanced by the opposing torque of spring 12. Vertical speed will then be indicated by pointer 14 relative to the calibrated scale, not shown. For descending aircraft the opposite effect occurs and the airflow is from chamber A to chamber B causing the vane to be rotated in clockwise direction until there is again a balance of torques between the vane and the spring.

I have built and tested this vertical speed indicator and find that it is a marked improvement over prior instruments since it provides a degree of adjustment and excellence of operation unknown in the past, besides making it possible to calibrate the device in a fraction of a time formerly required.

While I have described my invention in connection with a vertical speed indicator, I realize that the same broad principles which I have disclosed can be applied to make improved fluid meters, pumps, rotary element engines, and other devices.

Various modifications can be made by those skilled in the art without departing from the spirit of my invention. For example the springs 27 could be eliminated and the screws 26 could be arranged to move the elements 23 toward or from the axis by having flanges on the screws rotatably fitted into slots in elements 23.

What I claim is:

1. In a fluid operated device, a casing having a portion with an inner surface circularly curved about an axis and having two spaced substantially plane surfaces, a shaft mounted to rotate through an angle about said axis, a partition extending from said circularly curved inner surface toward said shaft and in close proximity thereto, a plurality of inner wall elements adjacent said circularly curved inner surface and arcuately curved with respect to said axis, a plurality of cylindrical rods between end surfaces of said arcuately curved elements, spring means urging said curved elements into contact with said rods, spring means urging said arcuately curved elements toward said circularly curved inner surface, a plurality of screws threaded through said circularly curved casing portion for moving said arcuately curved elements toward said axis, a fluid operated paddle attached to said shaft and movable relative to said arcuately curved elements and said plane surfaces and closely adjacent thereto, resilient means for urging said shaft to rotate in one direction, means attached to said shaft for indicating its position, means for conducting fluid to and from said casing on one side of said paddle, and means for conducting fluid to and from said casing on the opposite side of said paddle.

2. The device as described in claim 1, edges of said arcuately curved elements being concave to fit against said rods.

3. The device as described in claim 1, said screws being in radial alignment with said rods.

References Cited

UNITED STATES PATENTS

| | | | |
|---|---|---|---|
| 2,294,282 | 8/1942 | Cerstvik | 73—179 |
| 2,355,694 | 8/1944 | Ardelt | 73—228 |
| 2,979,948 | 4/1961 | Gwathmey | 73—179 |
| 3,085,430 | 4/1963 | Gray | 73—179 |
| 3,111,029 | 11/1963 | Gray | 73—179 |
| 3,177,710 | 4/1965 | Faure-Herman | 73—230 |

LOUIS R. PRINCE, *Primary Examiner.*

N. B. SIEGEL, *Examiner.*